United States Patent [19]

Holmes

[11] Patent Number: 5,258,609
[45] Date of Patent: Nov. 2, 1993

[54] WIDE FIELD OF VIEW OPTICAL ELEMENT HAVING PLURAL REFLECTORS OF DIFFERENT WIDTHS

[75] Inventor: Alan W. Holmes, Santa Barbara, Calif.

[73] Assignee: Santa Barbara Research Center, Goleta, Calif.

[21] Appl. No.: 836,025

[22] Filed: Feb. 14, 1992

[51] Int. Cl.$^5$ ............................................. H01J 3/14
[52] U.S. Cl. ..................... 250/216; 359/833; 359/834
[58] Field of Search ............. 250/216; 359/725, 726, 359/831–837; 356/141, 152

[56] References Cited

U.S. PATENT DOCUMENTS

| | | | |
|---|---|---|---|
| 3,763,372 | 10/1973 | Fedotowsky et al. | 250/216 |
| 3,958,118 | 5/1976 | Schwarz | 250/221 |
| 4,325,633 | 4/1982 | Gardner | 356/141 |
| 4,467,194 | 8/1984 | Foreman | 250/216 |
| 4,554,448 | 11/1985 | Sillitto | 250/216 |
| 4,679,753 | 7/1987 | Landecker | 250/206.1 |
| 4,855,588 | 8/1989 | Holmes | 356/141 |
| 4,978,843 | 12/1990 | Yamakawa | 250/216 |

FOREIGN PATENT DOCUMENTS 0177130  4/1986 European Pat. Off. .
0344364 12/1989 European Pat. Off. .

Primary Examiner—David C. Nelms
Assistant Examiner—Stephone B. Allen
Attorney, Agent, or Firm—W. C. Schubert; W. K. Denson-Low

[57] ABSTRACT

A wide field-of-view optical element 12 suitable for use in a laser warning system including a frusto-conical block of optically transparent material having a first surface 14 and a second surface 16. The first surface 14 is parallel with the second surface 16 and coaxial therewith. The radius $R_1$ of the first surface 14 is less than the radius $R_2$ of the second surface such that the sides of the element 12 are slanted. Reflective material is coated on the interior 17 of the first surface 14 for directing incident optical energy toward a detector 20 mounted at the second surface 16. Similarly, a reflective material is coated on the interior 18 of the second surface 16 for directing incident optical energy to the detector 20 via the first surface 14. The second reflective coating on the second surface is disposed between the outer periphery thereof and a nonzero distance $R_3$ from the center thereof to provide an aperture at which the detector 20 may be mounted.

7 Claims, 2 Drawing Sheets

WIDE FIELD OF VIEW OPTICAL ELEMENT HAVING PLURAL REFLECTORS OF DIFFERENT WIDTHS

BACKGROUND OF THE INVENTION

1. Field of the Invention

This invention relates to optical sensors. More specifically, this invention relates to sensors for detecting laser illumination.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Laser target designators are well known in the art. These systems simply include a laser which outputs a beam which is directed by a spotter onto a target. Reflections of the beam from the target are detected and used to guide ordnance thereto.

The accuracy of these systems has created a need for an ability to detect an incoming targeting beam. This necessity arises in connection with the need to identify friend or foe (IFF) and to indicate laser targeting (laser warning).

Conventional IFF systems are typically implemented with radio waves. There is no known system for IFF in connection with a laser targeting system.

While laser warning systems are known in the art, conventional systems are generally too expensive and often too fragile for the rugged battlefield conditions characteristic of military applications. A conventional laser warning system may currently cost as much as the vehicle (e.g. jeep or truck) which the system is designed to protect.

Accordingly, a need exists in the art for an inexpensive, rugged IFF and laser warning system.

SUMMARY OF THE INVENTION

The need in the art is addressed by the present invention which provides a wide field-of-view optical element suitable for use in a laser warning system. The invention comprises a block of optically transparent material having a first surface and a second surface. The first surface is parallel with the second surface and coaxial therewith. The width $R_1$ of the first surface is less than the width $R_2$ of the second surface such that the sides of the element are slanted. A reflective material is coated on or disposed at the first surface for directing incident optical energy toward a detector mounted at the second surface. Similarly, a diffusely reflective material is coated on or disposed at the second surface for directing incident optical energy to the detector via the first surface. The second reflective coating on the second surface is disposed between the outer periphery thereof and a nonzero distance $R_3$ from the center thereof to provide an aperture at which a detector may be mounted.

DESCRIPTION OF THE INVENTION

The present invention is a laser warning system including a sensor of unique and advantageous design, a detector, and a circuit for processing signals generated thereby indicating the presence of an incoming laser beam.

Figure 1:
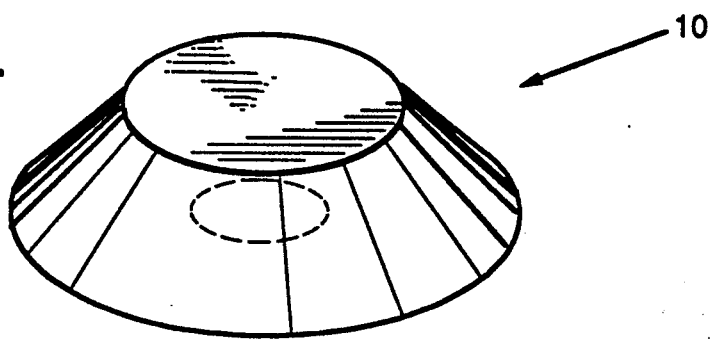
FIG. 1 is a perspective view of the sensor constructed in accordance with the present teachings.
Figure 2:
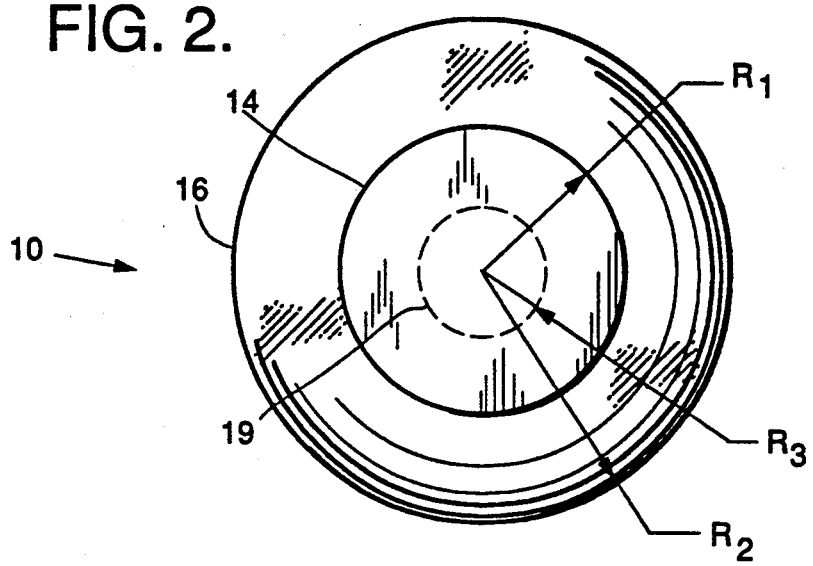
FIG. 2 is a top view of the sensor constructed in accordance with the present teachings.

FIG. 1 is a perspective view of the sensor 10 constructed in accordance with the present teachings. FIG. 2 is a top view of the sensor and FIG. 3 is a side view of the sensor.

Figure 3:
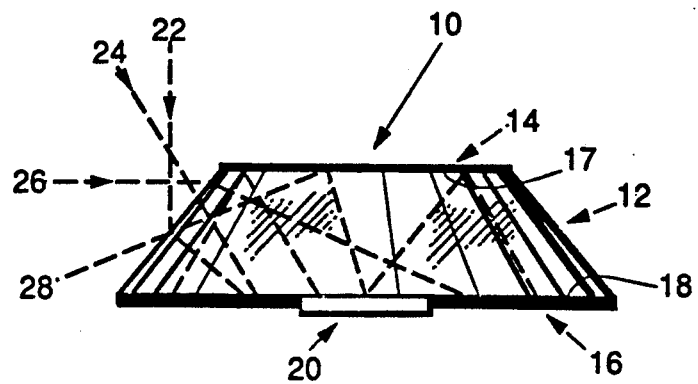
FIG. 3 is a side view of the sensor constructed in accordance with the present teachings.

As best illustrated in FIG. 3, the sensor 10 includes an element 12 of optical grade plastic or glass transparent at the wavelengths of interest. In the preferred embodiment, the element 12 is frusto-conical (truncated cone) in shape such that the top surface 14 is planar and parallel to a bottom surface 16 and coaxial therewith.

As illustrated in FIG. 2, the radius $R_1$ of the first surface 14 is less than the radius $R_2$ of the second surface 16 such that the sides of the element 12 are slanted. In the preferred embodiment, the radii of the top and bottom surfaces are chosen so that the sides are slanted at an angle of 45°.

Returning to FIG. 3, reflective material (either an optical thin film coating or reflective paint) is coated on the interior 17 of the top surface 14 to provide a reflective or mirrored surface for directing incident optical energy toward the detector 20 mounted at the aperture 19. The top surface 14 reflects light within the element 12 to the detector 20. A reflective material (e.g., white paint) is coated on the interior 18 of the bottom surface 16 for directing incident optical energy to the detector 20 via the top surface 14. The second reflective coating on the bottom surface is disposed between the outer periphery thereof and a nonzero distance $R_3$ from the center thereof. A small circular area at the center of the bottom interior surface 18 is unpainted to provide the aperture 19 which allows incoming rays of optical energy to pass through the element 12 to the detector 20. The detector 20 may be a conventional detector constructed of silicon or other suitable material. One such detector is the FND-100 currently available from EG&G Company of Massachusetts.

In operation, on receipt of incoming optical radiation from a laser target designator, the beam is directed to the detector 20 by the first and second reflective surfaces 17 and 18. First, second, third and fourth incoming optical beams 22, 24, 26, and 28 are shown in FIG. 3. As illustrated in FIG. 3, the optical element provides 360° of coverage in azimuth and −20° to 90° of coverage in elevation. Light entering the element 12 strikes the white bottom surface 18 and is diffusely scattered. The detector 20 sees a portion of the scattered light reflected in the top mirrored surface 17. Optical energy at the wavelength of interest is sensed by the detector 20 which provides an electrical output signal in response thereto.

Figure 4:
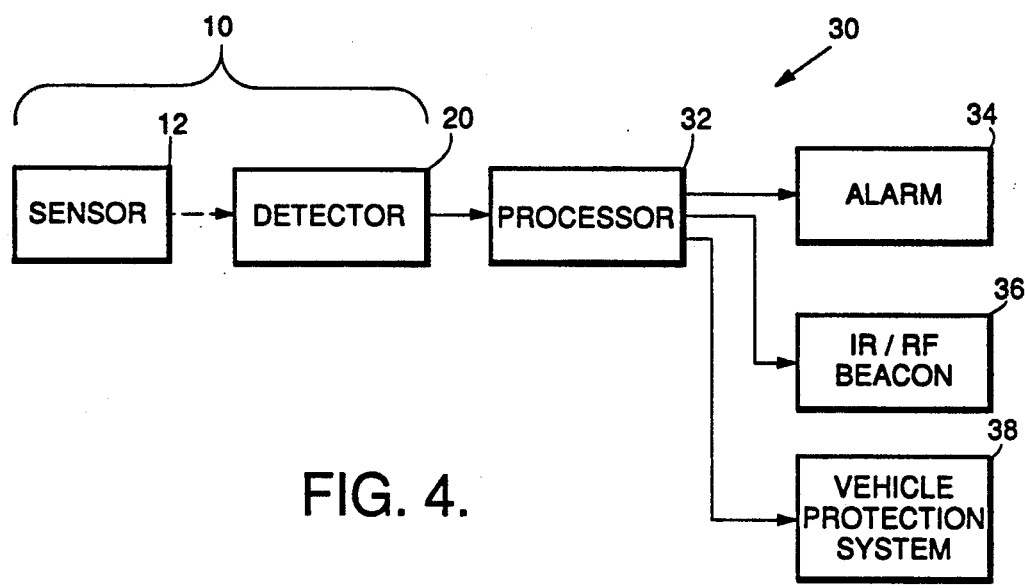
FIG. 4 is a block diagram of an illustrative electronic system for processing signals detected by the sensor of the present invention and providing an output in response thereto.

FIG. 4 is a block diagram of an illustrative electronic system 30 for processing the detected signals. The signals provided by the detector 20 are processed by a high speed analog/digital processor 32 to provide output signals appropriate for a given application, e.g., IFF or laser warning. For laser warning, the processor 32 might provide a signal to sound an alarm 34 or to activate appropriate systems 38 to address the potential threat. In an IFF application, the processor might provide a "friendly" code to a transmitter 36 for transmission. Those skilled in the art will appreciate that many systems can be used in connection with the optical element 12 of the present invention.

Thus, the invention provides a wide field-of-view optical element 12 suitable for use in a laser warning system. The present invention has been described with reference to a particular embodiment in connection with a particular application. Those having ordinary skill in the art and access to the teachings of the present invention will recognize additional modifications and applications within the scope thereof. For example, other shapes may be used for the optical element, such as a truncated pyramid, without departing from the scope of the present teachings.

It is therefore contemplated by the appended claims to cover any and all such modifications, applications and embodiments.

Accordingly, what is claimed is:

1. A wide field-of-view optical element comprising a block of optically transparent material having:

a first surface and a second surface, said first surface being parallel with said second surface and coaxial therewith, the width $R_1$ of the first surface being less than the width $R_2$ of said second surface such that the sides of said element are slanted;

first reflective means located on said first surface for directing optical energy incident thereon from within said block; and second reflective means located on said second surface for directing optical energy incident thereon from within said block.

2. The invention of claim 1 wherein said second reflective means is located on said second surface between the outer periphery thereof and a nonzero distance $R_3$ from the center thereto to provide an aperture.

3. The invention of claim 2 wherein an optical detector is mounted at said aperture.

4. The invention of claim 3 including electronic means of processing signals provided by said detector.

5. A laser warning system comprising:

a wide field-of-view optical element consisting of a frusto-conical block of optically transparent material having:

a first surface and a second surface, said first surface being parallel with said second surface and coaxial therewith, the width $R_1$ of the first surface being less than the width $R_2$ of said second surface such that the sides of said element are slanted, first reflective means located on said first surface for directing optical energy incident thereon from within said block, and second reflective means located on aid second surface for directing optical energy incident thereof from within said block, said second reflective means being located on said second surface between the outer periphery thereof and a nonzero distance $R_3$ from the center thereto to provide an aperture;

an optical detector mounted at said aperture; and electronic means for processing signals provided by said detector to indicate targeting by a laser target designator.

6. The invention of claim 2 wherein said first reflective means is a mirrored surface and whereas said second reflective means is a diffusely reflecting surface.

7. The invention of claim 5 wherein said first reflective means is a mirrored surface and whereas said second reflective means is a diffusely reflecting surface.

* * * * *